Patented Jan. 18, 1944

2,339,250

UNITED STATES PATENT OFFICE 2,339,250

CATALYTIC CRACKING OF HYDROCARBONS

Joseph D. Danforth, Chicago, Ill., assignor to Universal Oil Products Company, Chicago, Ill., a corporation of Delaware No Drawing. Application September 30, 1940, Serial No. 359,078

8 Claims. (Cl. 196—52)

This invention relates to a process for the conversion of hydrocarbons such as petroleum fractions and hydrocarbon oils generally in the presence of catalysts to produce substantial yields of hydrocarbons distilling within the gasoline boiling range and having high antiknock value. The process may be applied to conversion involving low boiling as well as high boiling hydrocarbons whether they are of synthetic or natural origin, or are produced, as for example, from primary distillate resulting from the destructive distillation of hydrocarbon-containing materials such as coals, lignites and shales.

In the cracking and reforming of hydrocarbon oil in the presence of cracking catalysts generally, there is a more or less rapid deposition of carbonaceous material due to reactions proceeding concurrently or incidentally to the gasoline-forming reactions. It has been found in connection with synthetic cracking catalysts consisting of hydrated silica activated by various hydrated oxides such as hydrated alumina, zirconia, thoria, vanadia, magnesia, etc. that granular particles of these refractory catalytic materials may be impregnated with an additional component to not only increase the yield of gasoline produced but also reduce the amount of carbonaceous material deposited upon the catalyst. This also results in a decrease in the amount of gas formation and an increase in the amount of higher boiling hydrocarbons recovered after the conversion reactions.

In one specific embodiment the present invention comprises subjecting hydrocarbon oil under conditions of temperature, pressure and time adequate to produce a substantial yield of high antiknock gasoline to contact with granular particles of a synthetically prepared composite of hydrated silica and hydrated alumina and/or zirconia, said particles having boric oxide impregnated thereon.

According to the invention hydrocarbon oils, more generally of a distillate character, are catalytically cracked preferably in the presence of specially prepared, synthetic hydrous oxide catalysts which have been further activated by impregnating a boron compound in and on the surfaces of granular particles of said catalysts and converting the boron compound to boric oxide.

In my copending application Serial No. 312,845, filed January 8, 1940, I have disclosed and claimed mixing boric oxide directly with this type of cracking catalyst. In the present invention, I have obtained improved results in catalytic cracking because the boric oxide is formed by new methods in and on the surfaces of the silica-alumina and/or zirconia catalyst so that the catalyst has a longer life, and higher temperatures and shorter time can be used in the process when regenerating the catalyst. The preferred catalysts of this invention are synthetically prepared mixtures of hydrated silica with hydrated zirconia and/or hydrated alumina. Thoria, magnesia, vanadia and other oxides may be similarly added but not with equivalent results. Numerous methods may be employed in preparing the synthetic cracking catalysts which are impregnated according to the invention. The components may be separately, concurrently or consecutively precipitated. According to one general method of preparation, the hydrated silica may be precipitated from a dilute solution of commercial water glass and subsequently mixed with the remaining hydrous oxide components. The components may be mixed for example by suspending the hydrated silica in a solution of a metal salt and then precipitating the hydrous oxide of the corresponding metal in the presence of the suspended hydrated silica by the addition of a suitable alkaline precipitant. Various other procedures may be followed wherein these components may be co-precipitated or separately precipitated and the components intimately commingled. The hydrated silica may also be heated in solutions of the added salts and hydrous oxides deposited in the presence of the hydrated silica by hydrolysis, or the hydrated silica may be mixed with a relatively concentrated solution of a metal salt to form a paste which is then heated to deposit the hydrated metal oxides.

In the manufacture of these refractory synthetic catalysts it has been found necessary where sodium compounds have been included in the catalytic material during preparation to treat the material at some stage of its preparation in order to remove these alkali metal impurities. This may be accomplished by washing with various acidic or salt solutions such as solutions of ammonium salts of strong acids or of salts of the metals of the hydrous oxides used. A desirable procedure consists in washing the hydrated silica prior to adding the remaining hydrated oxide by washing with acidulated water.

The composite gel which is usually recovered as a filter cake may be extruded or it may be dried and then mixed with a lubricant to facilitate adhesion of the particles and prevent adhering or sticking in the briquetting or pilling machines used in forming the material into pills, pellets or other consolidated and shaped particles. Various other methods are also available for making granular particles. The material is then rendered into final form by calcining at temperatures of the order of 1000–1600° F., more or less. Whatsoever the method of compositing the hydrous oxides constituting the preferred cracking catalyst and the subsequent procedures in consolidating or forming into granular particles, these particles may be improved according to the following procedures of the present invention although not necessarily with equivalent results. Similarly particles of some clays, glauconites (greensand) bentonites, and montmorillonites having more or less catalytic activity depending in part upon the method of preparation and also certain phosphates of aluminum, zirconium and titanium may be improved according to the invention.

The above granular particles are impregnated with a solution of a boron compound or a suitable liquid boron compound. Compounds which may be used are boric acid and organic borates, for example, or other boron compounds which will form boric oxide upon decomposition. The dried silica-alumina and/or zirconia catalyst may be dipped, immersed, sprayed or otherwise treated to absorb the boron compound while in a liquid condition. The impregnated catalyst is then heated or ignited for example whereby the solvent may be driven off and recovered while the impregnated boron compound is decomposed to produce boric oxide. Thus, a solution of boric acid in methyl alcohol or tri-amyl borate may be absorbed upon a synthetically prepared cracking catalyst which is subsequently heated or ignited to remove the liquid and form boric oxide in and on the surfaces of the cracking catalyst. A large number of organic compounds may be used such as dibutyl borate, triethyl boron, boron trimethyl, fluo-boric acid, etc., either as liquids or in organic solvents. Similarly, boric acid may be used and any suitable solvent may be employed. Alcoholic solutions are particularly desirable but the practice is not restricted thereto since glycerine has been employed with good results. Other polyhydroxy alcohols such as ethylene glycol may be used as well as triethanol amine. The concentration of boric oxide on the catalyst surfaces may be controlled by varying the concentration and amount of the solutions of the impregnated boron compound used. In the formation of the boric oxide on the catalyst surfaces, the impregnated boron compound may be decomposed in any desired manner. In the case of triamyl borate the catalyst may be ignited or it may be hydrolyzed in a current of moist air for example, the ignition procedure being preferable. Catalysts of this type containing approximately 2 to 8% of boric oxide by weight of the catalyst generally give good results but higher proportions of the boric oxide up to 15% or more may be employed.

Various types of hydrocarbon conversion reactions take place in the presence of the improved catalyst depending partly upon the temperature, pressure and time conditions and partly upon the nature of the hydrocarbon oil processed. These reactions may include carbon-to-carbon cleavage, isomerization, cyclization, dehydrogenation, hydrogenation and desulfurization reactions. In the case of higher boiling hydrocarbons, for example, there is a cleavage of long-chained carbon-to-carbon bonds. Isomerization reactions may occur whereby the lower boiling hydrocarbons formed tend to become more branch chained. Also hydroaromatic hydrocarbons present in the oil undergoing decomposition or formed therein by cyclization of olefins may undergo dehydrogenation to form aromatic hydrocarbons and hydrogen liberated in these reactions may combine with other olefins present during reaction to form paraffinic hydrocarbons. The latter reactions tend to occur at the lower temperatures given in the range of operating conditions whereas more unsaturated hydrocarbons, particularly olefins are produced at the higher temperatures employed. The hydrocarbons produced are generally of a more branched chain structure than are those produced in thermal cracking treatment. The temperatures employed may be a temperature from about 750° F. to about 1100° F. and the pressure employed may be from about atmospheric to about 300 pounds per square inch. The space velocities employed may vary from ¼ to 60, the space velocity being defined as the hourly volume of liquid hydrocarbon charged per volume of reaction space occupied by the catalyst.

The catalysts may be conveniently utilized in carrying out various types of hydrocarbon conversion reactions when employed as filling material in tubes or they may be disposed in trays or in tubes or they may be disposed in trays or in chambers. The average size of the particles may vary within the approximate range of 4 to 10 mesh more or less which is not restricted to any particular shape or method of particle formation. A hydrocarbon oil fraction may be heated to substantially reaction temperature and the vapors contacted with the stationary catalyst massed. The hydrocarbon vapors may be passed downward through the catalyst and where large beds of catalyst are involved the passage of vapors may be restricted to definite paths rather than allowing the vapors to have unrestricted contact with large beds of catalytic material. Where this method is used, the temperature of the contact materials while in use and during regeneration may be controlled by various operating procedures or by heat interchange devices. After the oil vapors have passed over the catalyst as in catalytic cracking for example, the products may be separated into high boiling fractions which are not to be further cracked and/or insufficiently converted fractions which may be subjected to further cracking treatment, and the gasoline and gaseous products. The higher boiling fractions may be removed from the system, may be returned directly to admixture with the charging stock for processing or may be processed in separate passes so as to ultimately obtain maximum utilization of the charging stock in producing the gasoline product.

The following specific examples are given to illustrate specific applications of the process of the invention, the method of catalyst preparation also being indicated. The invention should not be considered as limited to these examples of the process preparation since these are given merely as illustrations of the novelty and utility of the invention.

*Example I*

A catalyst having the approximate composition of $100SiO_2:5ZrO_2$ was prepared for subsequent impregnation with boric oxide as follows: The commercial sample of water glass of approximately 41° Baumé gravity and containing approximately 28.5% $SiO_2$ and 8.9% $Na_2O$ was diluted approximately 10 times with water. Hydrochloric acid was added to the diluted water glass solution while agitating thoroughly and a gel was precipitated. The addition of acid was continued until there was an excess of acid, the pH being approximately 3. The excess acid was substantially neutralized by the addition of ammonium hydroxide whereupon the hydrated silica was practically all precipitated. The precipitated silica was filtered and washed with water acidulated with hydrochloric acid by repeated reslurrying and filtering of the precipitated hydrated silica. The purified silica was suspended in a solution of zirconyl chloride in an amount suitable to form a catalyst of the above composition, and hydrated zirconia precipitated in the presence of the suspended hydrated silica by the addition of ammonium hydroxide. The composite precipitate was filtered and the filter cake given a water wash whereupon it was dried at a temperature of approximately 200–250° F. The dried material was then mixed with a small amount of a hydrogenated vegetable oil lubricant and formed into pelleted particles in a pilling machine. The pilled material was calcined at a temperature of approximately 1500° F. for one hour.

Separately, portions of the silica-zirconia catalyst above described were impregnated with solutions of boric acid in methyl alcohol to give a series of catalysts having various compositions of boric oxide as indicated in the table given below. The impregnated pellets were then dried in a stream of warm air and calcined at approximately 900° F. for one hour. These catalysts were disposed in a reactor, heated to a temperature of approximately 932° F., and a Pennsylvania gas oil was vaporized and preheated to approximately the same temperature and directed through the catalyst at a space velocity of 8 and at substantially atmospheric pressure. The results of these test runs are indicated below:

| Per cent $B_2O_3$ | Vol. per cent gasoline | Weight per cent gas |
|---|---|---|
| 0 | 23.5 | 5.2 |
| 1.96 | 25.6 | 6.4 |
| 2.91 | 26.2 | 6.0 |
| 3.84 | 25.4 | 6.4 |
| 4.75 | 27.0 | 7.0 |
| 5.66 | 27.5 | 7.4 |
| 7.40 | 28.2 | 7.2 |
| 14.0 | 27.0 | 5.9 |

The promoter effect of the boric oxide is brought out very clearly in the above series of catalysts.

Example II

A silica-zirconia catalyst was prepared similarly as in Example I and the catalyst after calcining and cooling was immersed in triamyl borate, the excess liquid drained off and the pills ignited. A portion of this catalyst was placed in a reaction chamber and heated to a temperature of approximately 932° F. and a Pennsylvania gas oil was vaporized and heated to a similar temperature and contacted with the catalyst at a space velocity of 4 and at approximately atmospheric pressure in a recycle operation of more than 70 cycles in which the oil is processed for one hour and regenerated for one hour. The results are given in the table below. A portion of the same catalyst impregnated with an alcoholic solution of boric acid so as to contain approximately 6 weight per cent of $B_2O_3$ in the finished product was similarly processed and the results obtained are also given below together with the results obtained when processing with an unimpregnated catalyst.

| Catalyst | Unimpregnated catalyst | Impregnated with $CH_3OH$ soln. of $H_3BO_3$ | Impregnated with triamyl borate |
|---|---|---|---|
| Vol. per cent gasoline | 48.2 | 47.9 | 48.3 |
| Bromine number | 36 | 54 | 55 |
| Octane number | 79.6 | 79.1 | 78.3 |
| Recovered bottoms: | | | |
| Vol. per cent | 27.8 | 37.6 | 39.3 |
| A. P. I. gravity | 31.2 | 33.4 | 33.8 |
| Liquid volume loss | 24.0 | 14.5 | 12.4 |
| Max. regen. temp. °F | 1,300+ | 1,300+ | 1,300+ |
| Time for regen. hours | 1½ | 1 | 1 |
| Weight per cent gas | 21.2 | 15.1 | 12.5 |

It is apparent from the above table that when cracking in the presence of the above unimpregnated and impregnated catalysts a much lower gas formation is obtained with the impregnated catalysts, and that a lower carbon formation is obtained since the catalyst can be regenerated in about two-thirds of the time required to regenerate the unimpregnated catalyst. In one test run where the amount of carbon on the catalyst was determined, it was found that the carbon was practically twice as large in amount on the unimpregnated catalyst as it was for the impregnated catalyst. A greater recovery of higher gravity oil is obtained from the processed oil after distilling out the gasoline. In the regeneration of the unimpregnated catalyst a hot spot burning is obtained wherein the burning zone gradually traverses the catalyst bed while for the impregnated catalyst this hot spot condition was not obtained.

I claim as my invention:

1. A process for the conversion of hydrocarbons to produce a substantial yield of high antiknock gasoline therefrom which comprises subjecting said hydrocarbons at a temperature of from about 750 to approximately 1100° F., at a pressure of from about atmospheric to approximately 500 pounds per square inch and at a liquid space velocity of from about ¼ to approximately 60 to contact with granular particles of a synthetically prepared composite of hydrated silica and hydrated zirconia, said particles having boric oxide impregnated thereon.

2. A process for the conversion of hydrocarbons to produce a substantial yield of high antiknock gasoline therefrom which comprises subjecting said hydrocarbons at a temperature of from about 750 to approximately 1100° F., at a pressure of from about atmospheric to approximately 500 pounds per square inch and at a liquid space velocity of from about ¼ to approximately 60, to contact with granular particles of a synthetically prepared composite of hydrated silica and hydrated zirconia, said particles having boric oxide impregnated thereon, and fractionating the reaction products therefrom to produce gaseous hydrocarbons, said high antiknock gasoline, and hydrocarbons of higher boiling point range.

3. A process for the conversion of hydrocarbons to produce a substantial yield of high antiknock gasoline therefrom which comprises subjecting said hydrocarbons at a temperature of from about 750 to approximately 1100° F., and a pressure of from about atmospheric to approximately 500 pounds per square inch and at a liquid space velocity of from about ¼ to approximately 60, to contact with granular particles of a synthetically prepared composite of hydrated silica and hydrated zirconia, said particles having boric oxide impregnated thereon, fractionating the reaction products therefrom to produce gaseous hydrocarbons, said high antiknock gasoline, and hydrocarbons of higher boiling point range, and returning said hydrocarbons of higher boiling point range to further contact with said catalyst.

4. A process for the conversion of hydrocarbons which comprises subjecting said hydrocarbon to contact with a catalyst produced by impregnating calcined particles comprising silica and zirconia with a boron compound and decompositing said boron compound into boric oxide.

5. The process of claim 4 further characterized in that said boron compound comprises a liquid boron compound.

6. The process of claim 4 further characterized in that the boron compound is carried in a solvent.

7. A process for the conversion of hydrocarbons which comprises subjecting the hydrocarbon under conversion conditions to contact with a catalyst comprising silica, alumina and zirconia having boric oxide impregnated thereon.

8. A process for the conversion of hydrocarbons which comprises subjecting the hydrocarbon under conversion conditions to contact with a catalyst produced by impregnating calcined particles comprising silica, alumina and zirconia with a boron compound and decomposing said boron compound into boric oxide.

JOSEPH D. DANFORTH.